United States Patent [19]

Yamazaki

[11] 4,380,859

[45] Apr. 26, 1983

[54] METHOD FOR TIGHTENING FASTENER ON AXIALLY CONNECTED ROD-LIKE MEMBERS

[75] Inventor: Akira Yamazaki, Kawanishi, Japan

[73] Assignee: Sumitomo Metal Industries, Ltd., Osaka, Japan

[21] Appl. No.: 223,058

[22] Filed: Jan. 7, 1981

Related U.S. Application Data

[62] Division of Ser. No. 36,730, May 7, 1979, Pat. No. 4,261,231.

[51] Int. Cl.$^{3}$ .......... B23P 19/00

[52] U.S. Cl. .......... 29/428; 29/526 R; 403/407

[58] Field of Search .......... 29/428, 446, 526 R, 29/240; 403/405, 406, 407; 81/55, 90 B, 57.32, 57.36, 57.46

[56] References Cited

U.S. PATENT DOCUMENTS

| | | | |
|---|---|---|---|
| 1,367,969 | 2/1921 | Holley | 81/55 |
| 1,476,341 | 4/1923 | LeBus et al. | 81/57.32 |
| 1,555,096 | 9/1925 | Bartelt | 81/57.32 X |
| 1,802,210 | 4/1931 | Kinser | 81/57.32 X |
| 2,035,661 | 3/1936 | Livingston | 403/407 X |
| 2,475,606 | 7/1949 | Gagnon | 81/90 B X |
| 2,787,180 | 4/1957 | Fish | 81/57.46 X |
| 2,817,257 | 12/1957 | Kniser | 81/57.46 |
| 3,902,385 | 9/1975 | Haby | 81/57.36 X |
| 4,048,875 | 9/1977 | Heinen | 81/55 X |

*Primary Examiner*—Charlie T. Moon

*Attorney, Agent, or Firm*—Griffin, Branigan & Butler

[57] ABSTRACT

A method and apparatus for tightening fasteners adapted to combine two bars in a linear fashion. The apparatus includes a first spanner member for engaging a first fastener and a second spanner member for engaging a second fastener. A driving apparatus is provided for rotating the second spanner member and includes a ratchet arrangement and a linear driving apparatus for driving the ratchet arrangement. The first and second spanner members are connected by a separable connection permitting easy separation or assembly. Further, the orientation of the first spanner member is adjustable therefore providing an apparatus which can be applied to and removed from the coupling assembly for two bars in spite of the random rotational orientation of the fasteners.

1 Claim, 11 Drawing Figures

METHOD FOR TIGHTENING FASTENER ON AXIALLY CONNECTED ROD-LIKE MEMBERS

This is a division of application Ser. No. 36,730, filed 5/07/79, now U.S. Pat. No. 4,261,231, issued Apr. 14, 1981.

BACKGROUND

This invention broadly relates to a method and an apparatus for tightening fasteners and more particularly to a method and apparatus for tightening nuts on axially connected rod-like members.

It is a well known method to combine two bars in a linear fashion by providing the mating ends of the bars with threads and connecting the bars with at least two nuts adapted to engage the threads in a fashion so that one nut functions as a coupling unit while the other nuts lock the coupling nut against movement. When utilizing this method, some amount of backlash remains between the threads of the bars and the threads of the nuts and if the nuts are not sufficiently tightened, this residual backlash causes an easy loosening of the coupling or a bending at the coupling of the bars. The effect of backlash is of particular concern when two reinforcing iron bars are combined by this method and buried in concrete, because the action of external forces upon the concrete structure often times bends the reinforcing iron bars at the coupling causing resulting cracks in the concrete surfaces above the loosened coupling.

In order to overcome the deleterious effect of backlash, studies have shown that minimum torque of 200 kg-m should be applied to the tightening nuts when coupling bars having a diameter of 32 mm. Since the conventional use of wrenches to tighten nuts by hand is insufficient to apply the requisite torque, often times, automatic tightening devices are used such as the hydraulic wrenches conceived by the present inventor and described in Japanese application No. 123999/76, No. 24277/77, and No. 36800/78.

All of these prior art hydraulic wrenches include two axially aligned spanners attached to a main body, a rack device for rotatably driving one of the spanners having an outer surface provided with cogs, and a hydraulic cylinder for driving the rack back and forth. Since one spanner is rigidly affixed to the main body and the other spanner is driven to rotate with respect to the main body, when the device is attached to two nuts to be tightened, and the hydraulic cylinder is charged, the resulting torque is applied equally between the two spanners. As a consequence, the main body of the device rotates in order to tighten both nuts simultaneously.

Some inconveniences have been noted with respect to rack-type hydraulic wrenches. Because the rack which is adapted to rotate the spanner is driven by a single stroke of the hydraulic cylinder, the length of the rack and the stroke of the hydraulic cylinder must be very long. As a result, devices of the rack-type are excessively large and heavy making it difficult for one operator to lift and situate the device in place.

Further, the rack and cogs formed on the driven spanner cannot be disengaged from one another. Therefore, if obstructions close to the bars to be coupled restrict the ability of the main body to rotate, both nuts cannot be tightened.

Additionally, if the main body of the hydraulic wrench encounters an obstacle during the tightening operation, the wrench cannot be removed without reversing the operation of the hydraulic cylinder thereby loosening the nuts to some extent.

SUMMARY OF THE INVENTION

It is a principle object of the present invention to provide a method and apparatus for tightening nuts on axially connected rod-like members capable of performing a tightening operation which is not disturbed by obstacles close to the apparatus while providing sufficient torque to prevent loosening of the nuts.

Another object of the present invention relates to a method of tightening nuts on axially connected rod-like members utilizing an apparatus wherein a first spanner member to fit a nut, a second spanner to fit another nut and a driving arrangement for rotating the second spanner member are mounted on a main body such that the driving arrangement includes a liner driving apparatus and a ratchet device capable of rotating the second spanner member in only one direction.

Another object of the present invention relates to a method of tightening nuts on axially connected rod-like members utilizing an apparatus which allows an operator to easily change the engagement angles between the first spanner member, the second spanner member and the main body, so that the main body can be returned to an initial operating position if the rotation of the main body is restricted by an obstacle during the tightening operation.

Yet another object of the present invention relates to an apparatus for tightening nuts wherein ratchet cogs are formed on the outer surface of the second spanner member which is driven in only one rotational direction by a ratchet claw pivoted on a slidable carrier driven by a linear driving apparatus which is relatively small and compact.

Yet another object of the present invention relates to an apparatus including a disengagement device capable of disengaging the ratchet claw from the ratchet cog formed on the outer surface of the second spanner member.

Yet another object of the present invention relates to a tightening apparatus wherein the first spanner member includes a rotation adjustment arrangement which allows easy application and removal of the apparatus from a work site without the need to alter the rotational orientation of the nuts as well as providing an arrangement for easily returning the main body to the initial operating position.

Yet another object of the present invention relates to a tightening device wherein the first and second spanner members may be separated from one another as well as the linear driving apparatus to provide easy handling of the apparatus.

In accordance with principles of the present invention, a method for tightening nuts on axially connected rod-like members is carried out by an apparatus wherein a first spanner member to fit a nut, a second spanner member to fit another nut, and a driving arrangement to rotate the second spanner member are mounted to a main body. The driving arrangement is adapted to rotate the second spanner member in only one rotational direction relative to the main body and includes a device for disconnecting the driving arrangement from the second spanner member. A rotation adjustment device connects the first spanner member to the main body and provides an arrangement for returning the main body of the apparatus to an original operating position when the driving arrangement is disconnected from the second spanner member.

The method of tightening nuts on axially connected rod-like members comprises the steps of applying the apparatus to the nuts to be tightened, driving the linear driving apparatus to turn the second spanner member relative to the main body, returning the linear driving apparatus to an original position, and repeating the driving and returning operations to tighten the nuts. Further, the method may include the additional step of returning the apparatus to an original operating position in the midst of the tightening operation and beginning the repetition of the driving and returning operations.

BRIEF DESCRIPTION OF THE DRAWINGS

The foregoing and other objects, features, and advantages of the invention will be apparent from the following more particular description of the preferred embodiment of the invention, as illustrated in the accompanying drawings in which like reference characters refer to the same parts throughout the different views. The drawings are not necessarily to scale, emphasis instead being placed upon the principles of the invention.

DESCRIPTION OF THE PREFERRED EMBODIMENT

Figure 2:
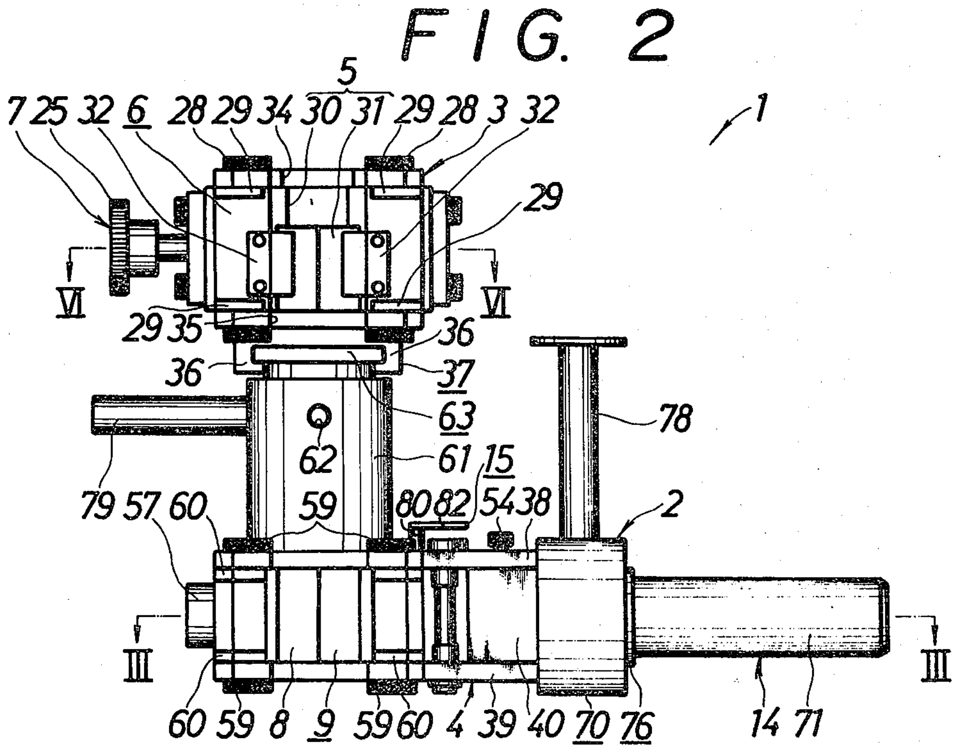
FIG. 2 is a front view of the tightening apparatus of the present invention.

Referring to FIG. 2, a tightening device 1 is illustrated wherein a first spanner member 6, a second spanner member 9 and a linear driving apparatus 14 are attached to a main body 2. The main body comprises a first body portion 3 and a second body portion 4 which are detachably connected to one another by a separable connection arrangement 63 which prevents the relative rotation of the body portions with respect to one another.

Figure 1:
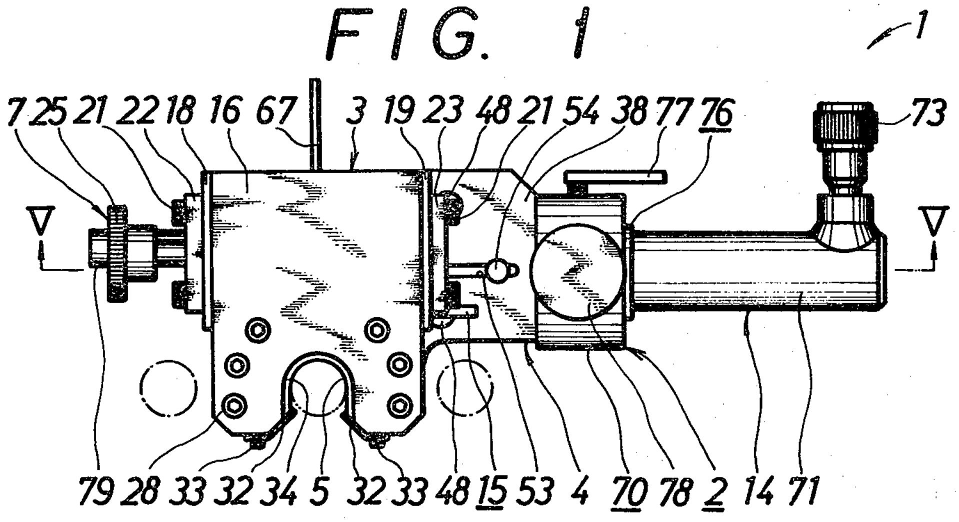
FIG. 1 is a top planar view of the tightening apparatus in accordance with the present invention.
Figure 4:
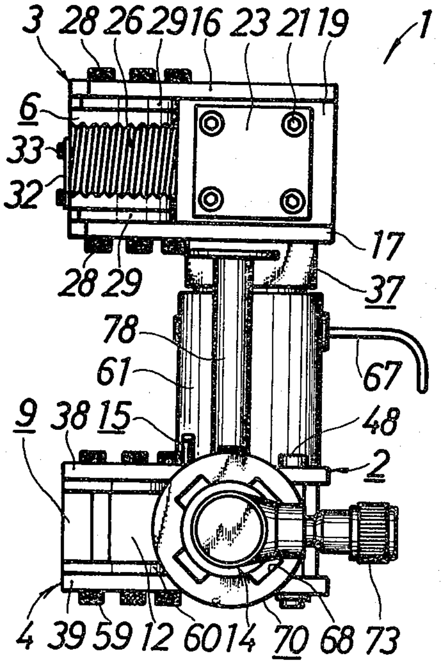
FIG. 4 is a right side view of the tightening apparatus in accordance with the present invention.
Figure 6:
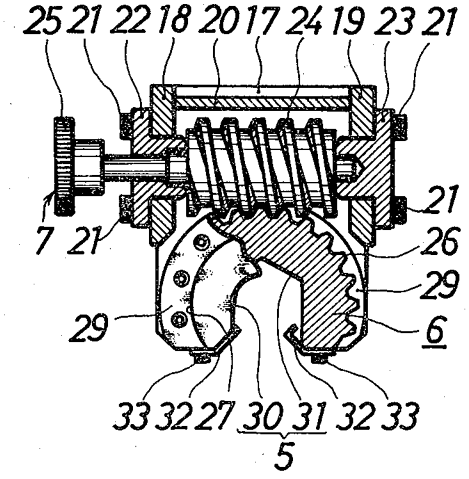
FIG. 6 is a sectional view taken along line 6—6 as seen in FIG. 2.

As seen in FIGS. 1, 2, and 4, the first body portion 3 includes a housing having an upper plate 16, a lower plate 17, two side plates 18, 19 and a rear plate 20. U-shaped notches 34,35 are formed in the upper and lower plates 16,17 respectively.

Rotatably attached to the front of the housing of the body portion 3 by a rotation adjustment device 7 is the spanner member 6 having a worm gear 26 formed upon its outer surface which is adapted to engage a worm 24 mounted in the housing by bearings 22,23 fixed to the side plates 18,19 by bolts or other suitable fasteners 21. On the top and bottom of the spanner member 6 are guide arcs 27,27, which are held in place by arc plates 29,29 affixed to the inner surface of plates 16,17 by bolts or other suitable fasteners 28. When an operator rotates a knob 25 which operatively engages worm 24; the spanner member 6 is driven to rotate in the arc plate 29,29 around an imaginary center axis formed by the arc plates 29,29.

As seen in FIGS. 1, 2, 6 and 7 the spanner member 6 includes a spanner portion 5 adapted to engage a nut to be tightened. At the upper half of the spanner portion 5 is a narrow U-shaped notch 30 and the lower half of the spanner member 5 includes a polygonal surface 31 adapted to fit around a nut (in the embodiment, the nuts are assumed to be hexagonal). At the front of the polygonal surface 31 are two bent plates 32,32 which are fixed to the first spanner member 6 by bolts or other suitable fasteners 33.

The U-shaped notch 3 and the U-shaped notches 34 and 35 formed in the upper and the lower plates 16,17 have a diameter sufficient to prevent interference with the rod-like members to be combined when the tightening apparatus 1 is attached to a work site.

Additionally, the first body portion 3 has a fitting device 37 formed on the bottom surface of the lower plate 17 comprising two fitting members 36,36 situated on both sides of the bottom. The fitting device 37 engages a separable connection arrangement 63 which connects the first body portion 3 and the second body portion 4.

As can be best seen in FIGS. 2 and 4, the second body portion 4 has a housing formed by a front plate 40, a side plate 41, and rear plates 42,43.

Figure 3:
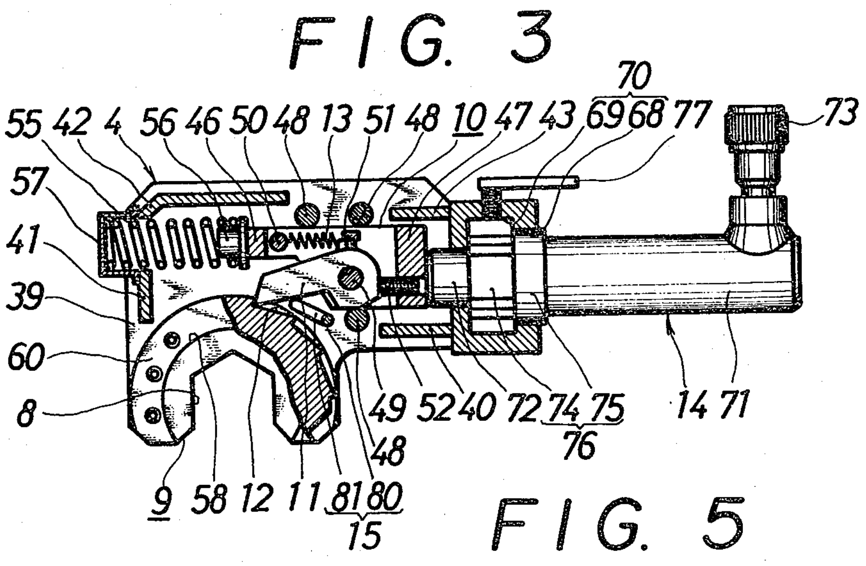
FIG. 3 is a sectional planar view taken along line 3—3 in FIG. 2.

Referring to FIG. 3, a carrier 10 is arranged in the housing to be slidable along the longitudinal axis of the second body portion 4. The carrier 10 includes an upper board 44, a lower board 45, and two side boards 46,47. Three guide pins 48,48,48 and two plates 38,39 form a longitudinal passage to guide the carrier 10 as it is slidably driven by the linear driving apparatus 14.

A ratchet claw 11 is pivotably connected by pivot 49 to both plates 44,45 of the carrier 10. A resilient member or spring 13 is also included having one end attached by pin 50 to the carrier 10 and its other end attached to the ratchet claw 11 by a pin 51. The resilient member 13 biases the ratchet claw 11 so as to apply a rotational force to drive the ratchet claw in a counter-clockwise direction as seen in FIG. 3. A stop bolt 52 is attached to the side board 47 to restrict the ratchet claw 11 from rotation in the clockwise direction. A return spring 55 is provided to return the carrier 10 to an original operating position after it has been driven by the linear driving apparatus 14 and the return spring 55 is situated between a spring holder 56 on the carrier 10 and a spring box 57 located on the side plate 41 of the housing.

Figure 5:
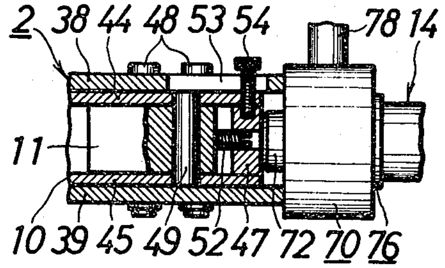
FIG. 5 is a partial sectional front view of the carrier portion of the present invention taken along line 5—5 in FIG. 1.

With reference to FIG. 5, the upper plate 38 is provided with a slit 53 which extends in a longitudinal direction. At the top of the carrier 10 is a knob bolt 54 having a head which projects through the slit 53 to provide a convenient fine adjustment arrangement.

Ratchet cogs 12 are cut out on the outer surface of the second spanner member 9 adapted to engage the pivotably mounted ratchet claw 11 of carrier 10. The spanner member 9, having a spanner portion 8, is rotatably mounted in the housing 1 by two guide arcs 58,58 held by arc plates 60,60 attached to the upper and lower plates 38,39 respectively by bolts or other suitable fasteners 59. This arrangement allows the second spanner member 9 to rotate around an imaginary center axis determined by the arc plates 60,60 such that the rotational axes of both spanner memers 6,9 are axially aligned.

U-shaped notches are formed in the upper and lower plates 38,39 respectively, each having a diameter greater than the U-shaped notch 30 of the first spanner portion 5 so that the second spanner member 9 can engage or disengage a nut by movement in a direction perpendicular to the axis of rotation of the nut.

Formed on the upper plates 38 behind the second spanner member 9 is a main column 61 provided to cooperate with the separable connection arrangement 63. A top plank 66 is adapted for insertion between the two fitting members 36 of the fitting device 37 provided on the first main body 3 and a shaft portion 65 provide for insertion into the main column 61. The separable connection arrangement 63 joins the first body portion 3 to the second body portion 4 when the shaft portion 65 is inserted into the main column 61 and a fastening pin 67 is inserted through aligned pin holes 62,62 and 64,64 provided in the shaft portion 65 and the main column 61 respectively. This arrangement prevents the rotation of the first body portion 3 relative to the second body portion 4.

Figure 7:
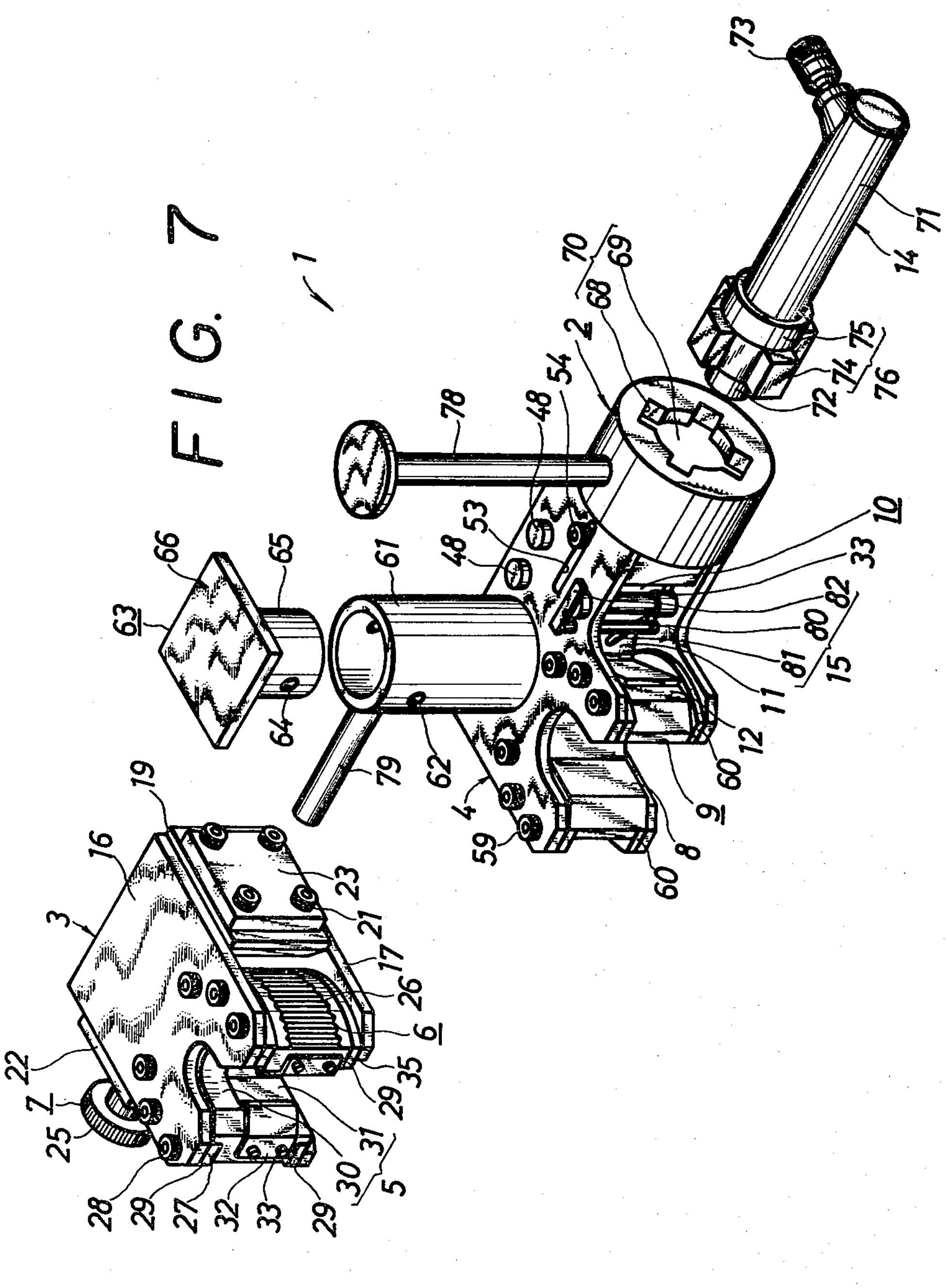
FIG. 7 is an exploded perspective view of the individual members comprising the tightening apparatus.

Referring to FIG. 3, FIG. 4 and FIG. 7, a receptacle casing 70 is affixed to the side of the second body portion 4 and includes an opening 68 providing access to an inner cavity 69. The linear driving apparatus 14 includes an insertion portion 67 having a neck 75 and cross-shaped protuberances 74 which cooperate with the opening 68. The driving apparatus 14 can be detachably connected to the second body portion 4 by inserting the insertion portion 76 into the cavity 69 through the opening 68 and rotating the driving apparatus 14 approximately 45° around its longitudinal axis. Since the linear driving apparatus is separable from the main body, the overall weight of the tightening apparatus 1 can be reduced making it convenient to convey the apparatus from a work shop to a building site.

In this particular embodiment, the driving apparatus 14 comprises a mono-drive hydraulic cylinder 71 having a piston rod 72 which is pushed forward by compressed oil injected through a coupling 73 from an external pump (not shown) and returned to an original position by a return spring (not shown) situated inside the casing. It is understood by those skilled in the art that instead of a mono-drive hydraulic cylinder, a doubledrive hydraulic cylinder is suitable as well as an electric motor or a fluid motor, and a reduction gear device driven by the motor.

Referring to FIG. 3 a disengagement device 15 is provided to disengage the ratchet claw 11 from the ratchet cog 12. The disengagement device 15 includes a pin 80 which is rotatably supported by the upper plate 38 and the lower plate 39; an arm 81 affixed to the middle of the pin 80; and a lever 82 is attached to the top of the pin 80. When the operator rotates the lever 82 in a clockwise direction, with reference to FIG. 3, the ratchet claw 11 is rotated clockwise and slips out of engagement with the cog 12.

In order to facilitate easy handling of the device, a vertical holder 78 is erected on the receptacle casing of the second body portion 4 which cooperates with a side holder 79 projecting from the side of the main column 61.

With reference to FIGS. 8—11, a preferred method is illustrated for combining two bars. It is understood that at least two nuts are necessary to combine two bars A and B having threads A′ and B′ respectively; however in this embodiment, three nuts C, D, and E are utilized.

Figure 11:
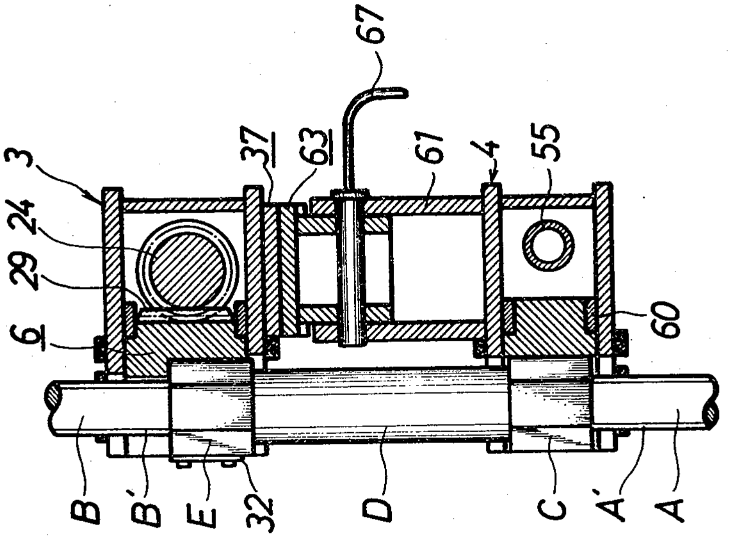
FIG. 11 is a simplified side view of two iron bars, three nuts and the tightening apparatus attached to two lock nuts.
Figure 10:
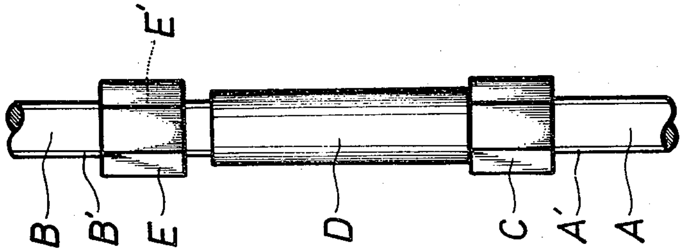
FIG. 10 is a side view of two iron bars coupled and locked by three nuts.
Figure 9:
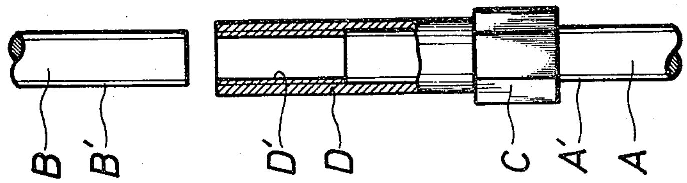
FIG. 9 is a simplified side view of the iron bar fitted with a lock nut and a coupling nut, and an iron bar to be coupled.
Figure 8:
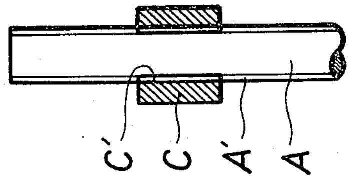
FIG. 8 is a simplified side view of an iron bar fitted with a lock nut.

Initially, a lock nut C is screwed on the standing bar A (FIG. 8) then a long coupling nut D is threaded on the remaining exposed thread portion A′ until the coupling nut D abuts the lock nut C (FIG. 9). Thereafter, the second bar B, which has lock nut E affixed thereon, is coupled to the nut D until the respective ends of the bars A and B contact one another (FIG. 10). The two lock nuts C and D are then turned by hand after which the tightening apparatus 1 is attached to the coupling site (FIG. 11).

In order to attach the tightening apparatus 1 to the work site, the fastening pin 67 is removed so that the first body portion 3 is separated from the second body portion 4. The operator can then easily lift the first body portion 3 above the top of the upper bar B so that the first spanner member 6 surrounds the bar B. The first main body 3 is then moved in a downward direction along the bar B until the U-shaped notch 30 engages the nut E. Since the U-shaped notch 30 is narrower than the nut E, the first body member 3 hangs upon the upper nut E. The operator can turn the knob 25 of the rotation adjustment device 7 to adjust the first body portion 3 to coincide with the arrangement of the lower nut C. Thereafter, the operator lifts up the second body portion 4 holding the vertical holder 78 and the side holder 79 and inserts the top plank 66 of the separable connection arrangement 63 into the fitting device 37 of the first body portion 3 so that the second spanner member engages the lower nut C (FIG. 11). This coupling operation is necessary when the hexagonal surfaces of the nuts C and E are not parallel. If the hexagonal surface of the nuts C and E are parallel, then the operator can fit the fully assembled apparatus including both body portions 3 and 4 directly onto the two nuts C and E simultaneously.

Once the tightening apparatus 1 is attached to the work site, the operator charges the hydraulic cylinder 71 with compressed fluid provided by the fluid pressure pump (not shown). This drives the piston rod 72 so as to slide carrier 10 such that the ratchet claw 11 engages the ratchet cog 12 on the second spanner member 9 which rotates nut C.

Because the first body portion 3 and the second body portion 4 are coupled against rotation with respect to one another, the torque is applied to both spanner members 6,9 equally and if the friction of the nut C and E are the same, both nuts are rotated simultaneously in opposite direction.

If one tightening operation is not sufficient, the operator exhausts fluid from the hydraulic cylinder 71 and the ratchet claw 11 pivotably mounted on carrier 10 returns to an initial position so as to engage a second cog 12 on the second spanner member 9. The operator again charges the cylinder 71 with compressed fluid to drive the carrier 10 so that the ratchet claw 11 rotates the second spanner member 9 with respect to the main body 2. This operation may be repeated as many times as there are cogs 12 on the spanner member 9. In this particular embodiment, the spanner member 9 is provided with four cogs although it is understood that the spanner member 9 could be provided with more ratchet cogs.

To remove the tightening apparatus 1 from the nuts C and E, the operator removes the fastening pin 67 to separate the first and the second body portions 3 and 4 from one another. The operator then turns the lever 82 to disengage the ratchet claw 11 from the cogs 12 and rotates the second body portion 4 until the spanner member 9 returns to the original operating position so that the second body portion 4 can be removed from the nut C. The first body portion 3 can then be lifted above the upper bar B and removed from the work site.

The above noted method of operation is suitable when the work site is not situated close to obstacles, such as the bars depicted in FIG. 1 by imaginary lines, which restrict the ability of the main body 2 to rotate during the tightening operation. In this instance, the tightening operation is repeated until the apparatus 1 collides with a bar which makes further rotation impossible thereby preventing tightening of the nuts. In this case, the operator disengages the ratchet claw 11 from the cog 12 by pulling the lever 82 of the disengagement device 15 with his right hand, and utilizing his left hand, rotates the knob 25 of the rotation adjustment device 7 to return the apparatus 1 to the original operating position. The tightening operation is then repeated until the nuts are tight.

While the invention has been particularly shown and described with reference to preferred embodiments thereof, it is understood by those skilled in the art that various changes in form and detail may be made therein without departing from the spirit and scope of the invention as described by the appended claims.

The embodiments of the invention in which an exclusive property or privilege are claimed are defined as follows:

1. A method of tightening nuts on axially connected rod-like members utilizing a tightening apparatus of the type wherein a first spanner member to fit a nut to be rotated in a first direction is rotatably fixed relative to a main body member; a second spanner member to fit another nut to be rotated in a direction opposite to said first nut is rotatably mounted relative to said main body member; and, a driving apparatus rotates the second spanner member; the method comprising the steps of:
- driving said driving apparatus to turn said second spanner member in said opposite direction relative to said main body utilizing a ratchet device, returning said driving apparatus to an original state;
- repeating said driving and said returning operations;
- returning said driving apparatus to an original operating position after the tightening operation has begun; and
- further repeating said driving and returning operations of said driving apparatus until said nuts are tightened.

* * * * *